(12) United States Patent
Willham

(10) Patent No.: US 8,268,106 B2
(45) Date of Patent: *Sep. 18, 2012

(54) MULTIVARIATE COLOR SYSTEM WITH TEXTURE APPLICATION

(75) Inventor: John E. C. Willham, Sandy, UT (US)

(73) Assignee: 3form, Inc., Salt Lake City, UT (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/445,573

(22) Filed: Apr. 12, 2012

(65) Prior Publication Data

US 2012/0193028 A1    Aug. 2, 2012

Related U.S. Application Data

(60) Continuation of application No. 13/337,793, filed on Dec. 27, 2011, now Pat. No. 8,157,942, which is a continuation of application No. 13/149,526, filed on May 31, 2011, now abandoned, which is a division of application No. 12/376,156, filed as application No. PCT/US2008/063124 on May 8, 2008, now Pat. No. 8,182,903.

(60) Provisional application No. 60/916,803, filed on May 8, 2007.

(51) Int. Cl.
*B32B 37/00* (2006.01)

(52) U.S. Cl. ......... 156/209; 156/219; 156/228; 156/553

(58) Field of Classification Search .................. 156/209, 156/219, 228, 553, 555, 580, 581, 582, 583.1
See application file for complete search history.

(56) References Cited

U.S. PATENT DOCUMENTS

| | | | |
|---|---|---|---|
| 2,660,824 | A | 12/1953 | Neugass |
| 3,255,781 | A | 6/1966 | Gillespie |
| 3,371,003 | A | 2/1968 | Goodman |
| 3,465,062 | A | 9/1969 | Holoch et al. |
| 3,560,600 | A | 2/1971 | Gliniecki |
| 3,616,029 | A | 10/1971 | Lerman |
| 3,833,537 | A | 9/1974 | Jaquiss |

(Continued)

FOREIGN PATENT DOCUMENTS

DE    1694354    6/1971

(Continued)

OTHER PUBLICATIONS

Reynald Tombini, Abstract of French Patent 2661362, Mar. 1992, Derwent Information Ltd., USA.

(Continued)

*Primary Examiner* — James Sells
(74) *Attorney, Agent, or Firm* — Workman Nydegger

(57) ABSTRACT

Implementations of the present invention relate to a translucent and/or transparent polymer-based panel system that incorporates multi-colored insert layers that enable manipulation of color, transparency or light transmission of the finished panel system. Implementations of the present invention also relate to the construction of such panels to avoid the capture and retention of air within the panels through the use of textured surfaces at the lamination interfaces. In addition, implementations of the present invention provide a method of quantifying the optical response achieved in a given panel system and describes types of construction that enable the multiplicity of color and optic manipulation. Furthermore, implementations of the present invention provide methods for applying texture in an efficient, uniform manner.

54 Claims, 4 Drawing Sheets

U.S. PATENT DOCUMENTS

| | | | |
|---|---|---|---|
| 3,937,765 A | 2/1976 | Toy et al. |
| 3,964,958 A | 6/1976 | Johnston |
| 4,199,489 A | 4/1980 | Short |
| 4,219,635 A | 8/1980 | Cooke |
| 4,227,979 A | 10/1980 | Humke |
| 4,235,948 A | 11/1980 | Holmes |
| 4,301,040 A | 11/1981 | Berbeco |
| 4,308,782 A | 1/1982 | Hartry |
| 4,368,231 A | 1/1983 | Egert et al. |
| 4,403,004 A | 9/1983 | Parker et al. |
| 4,409,275 A | 10/1983 | Samowich |
| 4,443,581 A | 4/1984 | Robeson et al. |
| 4,521,835 A | 6/1985 | Meggs et al. |
| 4,543,292 A | 9/1985 | Giles, Jr. et al. |
| 4,634,483 A | 1/1987 | Spengler |
| 4,642,255 A | 2/1987 | Dlubak |
| 4,648,690 A | 3/1987 | Ohe |
| 4,656,080 A | 4/1987 | Takahashi et al. |
| 4,683,172 A | 7/1987 | LeGrand et al. |
| 4,824,722 A | 4/1989 | Jarrett |
| 4,900,611 A | 2/1990 | Carroll |
| 4,921,755 A | 5/1990 | Carroll et al. |
| 4,923,657 A | 5/1990 | Gembinski |
| 4,939,009 A | 7/1990 | Beavers et al. |
| 5,064,980 A | 11/1991 | Grossman et al. |
| 5,073,421 A | 12/1991 | Akao |
| 5,108,678 A | 4/1992 | Hirasaka et al. |
| 5,192,609 A | 3/1993 | Carroll |
| 5,221,569 A | 6/1993 | Rohrka et al. |
| 5,277,952 A | 1/1994 | Watras |
| 5,352,532 A | 10/1994 | Kline |
| 5,364,926 A | 11/1994 | Sakashita et al. |
| 5,413,828 A | 5/1995 | De Keyser |
| 5,425,977 A | 6/1995 | Hopfe |
| 5,455,103 A | 10/1995 | Hoagland |
| 5,458,966 A | 10/1995 | Matsumoto et al. |
| 5,496,630 A | 3/1996 | Hawrylko et al. |
| 5,514,428 A | 5/1996 | Kunert |
| 5,605,751 A | 2/1997 | Suzuki et al. |
| 5,643,666 A | 7/1997 | Eckart et al. |
| 5,663,280 A | 9/1997 | Ogoe et al. |
| 5,743,631 A | 4/1998 | Bigham |
| 5,760,120 A | 6/1998 | Itoh et al. |
| 5,776,838 A | 7/1998 | Dellinger |
| 5,837,091 A | 11/1998 | Theil |
| 5,871,570 A | 2/1999 | Koyama et al. |
| 5,894,048 A | 4/1999 | Eckart et al. |
| 5,899,783 A | 5/1999 | Kimbrell, Jr. et al. |
| 5,958,539 A | 9/1999 | Eckart et al. |
| 5,998,028 A | 12/1999 | Eckart et al. |
| 6,022,050 A | 2/2000 | Kline |
| 6,025,069 A | 2/2000 | Eckart et al. |
| 6,044,650 A | 4/2000 | Cook et al. |
| 6,081,659 A | 6/2000 | Garza |
| 6,117,384 A | 9/2000 | Laurin et al. |
| 6,136,441 A | 10/2000 | MacGregor et al. |
| 6,187,699 B1 | 2/2001 | Terakawa et al. |
| 6,189,330 B1 | 2/2001 | Retallick et al. |
| 6,221,939 B1 | 4/2001 | Campbell et al. |
| 6,228,912 B1 | 5/2001 | Campbell et al. |
| 6,235,380 B1 | 5/2001 | Tupil et al. |
| 6,319,432 B1 | 11/2001 | Harrod et al. |
| 6,333,094 B1 | 12/2001 | Schneider et al. |
| 6,369,141 B1 | 4/2002 | Ishii et al. |
| 6,387,477 B1 | 5/2002 | Ogura et al. |
| 6,388,046 B1 | 5/2002 | Campbell et al. |
| 6,401,002 B1 | 6/2002 | Jang et al. |
| 6,433,046 B1 | 8/2002 | Campbell et al. |
| 6,445,969 B1 | 9/2002 | Kenney et al. |
| 6,448,316 B1 | 9/2002 | Capitelli et al. |
| 6,531,230 B1 | 3/2003 | Weber |
| 6,562,163 B1 | 5/2003 | Wellington |
| 6,569,928 B1 | 5/2003 | Levchik et al. |
| 6,569,929 B2 | 5/2003 | Falcone et al. |
| 6,649,104 B2 | 11/2003 | Tadokoro |
| 6,683,520 B1 | 1/2004 | Sakai |
| 6,685,993 B1 | 2/2004 | Hansson et al. |
| 6,743,327 B2 | 6/2004 | Schober |
| 6,769,467 B2 | 8/2004 | Escobedo |
| 6,780,905 B2 | 8/2004 | Bienmuller |
| 6,828,009 B2 | 12/2004 | Benz |
| 6,896,966 B2 | 5/2005 | Crawford |
| 6,969,745 B1 | 11/2005 | Taraiya et al. |
| 7,008,700 B1 | 3/2006 | Goodson et al. |
| 7,114,737 B1 | 10/2006 | Rasmussen |
| 7,803,449 B2 | 9/2010 | Inoue |
| 8,157,942 B1 * | 4/2012 | Willham .................. 156/209 |
| 8,182,903 B2 * | 5/2012 | Willham .................. 428/195.1 |
| 2001/0016626 A1 | 8/2001 | Vollenberg et al. |
| 2002/0019466 A1 | 2/2002 | Falcone et al. |
| 2002/0032299 A1 | 3/2002 | Matsumoto et al. |
| 2002/0100540 A1 | 8/2002 | Savitski et al. |
| 2002/0115761 A1 | 8/2002 | Eckel et al. |
| 2002/0122926 A1 | 9/2002 | Goodson |
| 2002/0145276 A1 | 10/2002 | Veiga |
| 2003/0021981 A1 | 1/2003 | Lu |
| 2003/0083408 A1 | 5/2003 | Bienmuller et al. |
| 2003/0113485 A1 | 6/2003 | Schober |
| 2003/0171494 A1 | 9/2003 | Aramaki et al. |
| 2004/0021961 A1 | 2/2004 | Munro |
| 2004/0039090 A1 | 2/2004 | Seidel et al. |
| 2004/0053040 A1 | 3/2004 | Goodson et al. |
| 2004/0127653 A1 | 7/2004 | Ellington et al. |
| 2004/0202800 A1 | 10/2004 | Schober |
| 2005/0049369 A1 | 3/2005 | O'Neil et al. |
| 2005/0221042 A1 | 10/2005 | Chirhart |
| 2005/0259300 A1 | 11/2005 | Burberry |
| 2006/0072198 A1 | 4/2006 | Parisi |
| 2006/0188695 A1 | 8/2006 | Yacovone |

FOREIGN PATENT DOCUMENTS

| | | |
|---|---|---|
| DE | 2505326 | 8/1975 |
| DE | 2536654 | 2/1977 |
| DE | 4214383 | 11/1993 |
| DE | 29615956 | 11/1996 |
| DE | 10137930 | 2/2003 |
| EP | 0016617 | 10/1980 |
| EP | 0072626 | 2/1983 |
| EP | 0157030 | 6/1985 |
| EP | 0171730 | 2/1986 |
| EP | 0188791 | 7/1986 |
| EP | 0227922 | 7/1987 |
| EP | 0278685 | 8/1988 |
| EP | 0365266 | 4/1990 |
| EP | 0372324 | 6/1990 |
| EP | 0265171 | 9/1991 |
| EP | 0470618 | 2/1992 |
| EP | 0491266 | 6/1992 |
| EP | 0537577 | 4/1993 |
| EP | 0582383 | 2/1994 |
| EP | 0587353 | 3/1994 |
| EP | 0626256 | 11/1994 |
| EP | 0637509 | 2/1995 |
| EP | 0638749 | 2/1995 |
| EP | 0668318 | 8/1995 |
| EP | 0680996 | 11/1995 |
| EP | 0728811 | 8/1996 |
| EP | 0731307 | 9/1996 |
| EP | 0742096 | 9/1997 |
| EP | 0795398 | 9/1997 |
| EP | 0754897 | 11/1997 |
| EP | 0899306 | 3/1999 |
| EP | 0909635 | 4/1999 |
| EP | 0928683 | 7/1999 |
| EP | 0933256 | 8/1999 |
| EP | 1131378 | 12/2001 |
| EP | 1312472 | 5/2003 |
| FR | 1388691 | 2/1965 |
| FR | 1555527 | 1/1969 |
| FR | 2194543 | 3/1974 |
| FR | 2237859 | 2/1975 |
| FR | 2661362 | 4/1991 |
| FR | 2661362 A | 10/1991 |
| GB | 1461255 | 1/1977 |
| GB | 1517652 | 7/1978 |
| JP | 53083884 | 7/1978 |
| JP | 55135158 | 10/1980 |

| | | |
|---|---|---|
| JP | 56123235 | 9/1981 |
| JP | 59123659 | 7/1984 |
| JP | 63022816 | 1/1988 |
| JP | 63194949 | 8/1988 |
| JP | 1206010 | 8/1989 |
| JP | 1249336 | 10/1989 |
| JP | 3143950 | 6/1991 |
| JP | 3285958 | 12/1991 |
| JP | 4214779 | 8/1992 |
| JP | 4224385 | 8/1992 |
| JP | 5293916 | 11/1993 |
| JP | 6031862 | 2/1994 |
| JP | 6220290 | 8/1994 |
| JP | 7125000 | 5/1995 |
| JP | 7126483 | 5/1995 |
| JP | 7195496 | 1/1996 |
| JP | 8085174 | 4/1996 |
| JP | 10175985 | 10/1997 |
| JP | 9277483 | 6/1998 |
| JP | 2002161211 | 6/2002 |
| WO | 9322373 | 11/1993 |
| WO | 9322382 | 11/1993 |
| WO | 9907779 | 11/1993 |
| WO | 9608370 | 3/1996 |
| WO | 9722474 | 6/1997 |
| WO | 9829245 | 7/1998 |
| WO | 0012609 | 3/2000 |
| WO | 0012611 | 3/2000 |
| WO | 0012612 | 3/2000 |
| WO | 0012614 | 3/2000 |
| WO | 0024580 | 5/2000 |
| WO | 0027927 | 5/2000 |
| WO | 03023684 | 3/2003 |
| WO | 2005044906 | 5/2005 |
| WO | 2006096196 | 9/2006 |
| WO | 2006127219 | 11/2006 |
| WO | 2006127222 | 11/2006 |
| WO | 2006127231 | 11/2006 |

OTHER PUBLICATIONS

Chemical Abstracts, vol. 116, No. 4, Jan. 27, 1992 Columbus, Ohio, US; abstract No. 22152, XP002126370.

Chemical Abstracts, vol. 122, No. 12, Mar. 20, 1995 Columbus, Ohio, US, abstract No. 134965.

Chemical Abstracts, vol. 117, No. 2, Jul. 13, 1992 Columbus, Ohio, US, abstract No. 9164.

van Aert, H A M, et al. Poly(bisphenol A carbonate)-Poly(dimethyliloxane) multiblock copolymers, Polymer, vol. 42, No. 5, Mar. 2001 pp. 1781-1788.

Standard Test Method for Surface Burning Characteristics of Building Materials, ASTM International; pp. 1-19, May 7, 2004.

Abstract, Description of corresponding document: FR2321388, publication date Mar. 18, 1977.

Office Action Mailed Jun. 23, 2011 on U.S. Appl. No. 12/376,156.

Office Action Mailed Jan. 31, 2012 on U.S. Appl. No. 12/376,156.

Ebnesajjad, Sina, Surface Treatment of Materials for Adhesion Bonding, William Andrew Publishing, Published 2006.

ISR and Opinion on PCT/US2008/063124, Mailed Jul. 30, 2008.

* cited by examiner

MULTIVARIATE COLOR SYSTEM WITH TEXTURE APPLICATION

CROSS-REFERENCE TO RELATED APPLICATIONS

This application is a continuation of U.S. patent application Ser. No. 13/337,793, filed on Dec. 27, 2011, now U.S. Pat. No. 8,157,942, which is a continuation of U.S. patent application Ser. No. 13/149,526, filed on May 31, 2011, now abandoned, which is a divisional of U.S. patent application Ser. No. 12/376,156, filed on Feb. 3, 2009, now U.S. Pat. No. 8,182,903, which is a U.S. National Stage Application corresponding to PCT Application No. PCT/US08/63124, filed on May 8, 2008, entitled "Multivariate Color System with Texture Application," which claims the benefit of priority to U.S. Provisional Patent Application No. 60/916,803, filed on May 8, 2007, entitled "Multivariate Color System." The entire content of each of the aforementioned patent applications is incorporated herein by reference.

BACKGROUND OF THE INVENTION

1. The Field of the Invention

This invention relates to translucent and/or transparent polymer-based panel assemblies that incorporate colors through applied colored film layers.

2. Background and Relevant Art

Laminated translucent panel systems have achieved a wide utility in designed architectural assemblies and applications as well as lighting and display applications. One of the main facets that is of significant interest is the ability to add color to such panel systems. Translucent panel systems come in a variety of forms and assemblies ranging from composites and products produced from polymers to glass. Traditional means of achieving color with the aforementioned substrates are through paints and coatings, dye and pigment concentrates or dispersants, or through adhesion of colored films, fabrics or papers. Many of the aforementioned coloring systems introduce aesthetic, performance or manufacturing constraints when combined with the aforementioned polymer-based or glass-based panel systems.

One category of methods to achieve a colored translucent or transparent thermoplastic panel is through direct application of color through screen printing or painting. Using screen printing, ink is applied to the surface using traditional screen printing methods. Drawbacks of screen printing include the fact that the ink may be scratched off of the panel surface. In addition, the ink typically needs to be bonded to the panel with bonding additives that are often solvent-based and often produce undesirable volatile organic compound (VOC) emissions.

Painting is another way of applying color to the surface of a panel. Like screen printing, paint may also be scratched from the surface of the panel. Additionally, painting, and more particularly cleanup from painting, also results in undesirable VOC emissions. Moreover, colors or images applied through screen printing or painting are only correctly viewable from one side of the panel. Also, panels colored or decorated using these methods tend to require cure times of between four and twelve hours, during which time the panels require special storage and possibly drying units.

A second category of methods for achieving a colored translucent or transparent thermoplastic panel is through the infusion of color into the surface of the panel. One method of this category is dye sublimation printing, during which solid sources of dye, such as a printed transfer paper, are heated, placed in contact with a receiving substrate and the printed color or image is transferred to the substrate and subsequently cooled. This method results in the color or image penetrating the substrate such that it is more resilient to surface scratches. Moreover, the colors or images produced using this method may be viewed equally well from either side of the panel. The dye sublimation method, however, requires considerable technical expertise to create the digital master files and an understanding of the interaction of the dye with the substrate. Dye sublimation is also a capital-intensive operation that tends to require specialized printing equipment.

A second method in this category for infusing color into a translucent or transparent thermoplastic panel is by driving pigment into the surface chemically. For example, one conventional mechanism includes bombarding the surface of a thermoplastic panel with solvent that temporarily improves the solubility of the panel, thereby allowing dyes carried in the solvent to be transferred to and incorporated in the matrix of the thermoplastic panel. Although this method is not entirely capable of rendering a predetermined image, the color driven into the surface of the panel in this way does yield a homogeneous color, and is more resilient to surface abrasion than colors applied directly through screen printing or painting.

Unfortunately, this chemical process consumes large amounts of energy. The final quality also tends to be quite dependent on several process variables and strict process control. The cycle time, regulation of temperature and solvent concentration are driving forces that determine the quality of the finished panel. In addition, the equipment required to employ this method is very costly. Furthermore, it takes a significant amount of time to change over between one color and the next because the system must undergo a cleaning cycle to flush out each color after use.

A third category of means for imparting color to a translucent or transparent thermoplastic panel is through the use of a fabric interlayer. Here, the method of imparting color to panels includes the use of colored textiles. Using colored textiles to achieve a uniform panel color, however, presents several challenges. One challenge is that fabric has a texture of its own that remains visible through the translucent or transparent thermoplastic panel. In addition, while colored textiles may be used selectively to control the translucency of a panel, they tend to impair the transparency of a panel.

Moreover, thermoplastic panels with textile interlayers are not generally suitable for wet environments without additional fabrication precautions, because the fabric at the exposed edges of the panel will wick moisture into the interior of the panel. This wicking action through the fabric layer introduces color distortion and staining within the panel. In addition, the viewability of color or an image depends upon whether the color or pattern is woven into the fabric or printed on only one side of the fabric. Also, fabric interlayers interfere with recycling because they can not be easily separated from the resin substrate.

Furthermore, if more than one fabric interlayer is used, the most visible color will be that of the textile layer nearest the viewer, since colors are not blended or mixed when using textiles. In addition, care must be taken when laying up fabric interlayers because if they are not placed straight and taut, the fabric layer can create the appearance of waves. Still further, multiple layers of fabric may create the moiré effect, which can be further exaggerated depending on the thickness of any substrate interposed between fabric layers. Another consideration when constructing thermoplastic panels with fabric interlayers is that the fabric layer may not be on the surface.

Moreover, care must be taken to ensure that the fabric layer is laid up in the center of the overall panel thickness to create a "balanced lay-up."

Otherwise the panel, once constructed, will bow as it cools, and the bowing is an undesirable characteristic. Also, fabric layers within panels reduce the ability to thermoform the panels since the fabric will separate or pull away under deep draw conditions due to the physical limitations of the fabric. A last disadvantage of fabric layers within panels is that the fabric may wick moisture into the body of the laminated panel if edges are exposed to wet environments.

A fourth category of technology for coloring a translucent or transparent thermoplastic panel is through the use of films or "sheets" colored during manufacture with compounded pigments and dyes. In general, a "sheet" refers to that portion of a translucent polymeric resin panel which, in its prefabrication state, is a unitary extrusion of material, typically measuring 2-6 feet wide and 8-12 feet long, and at least $\frac{1}{32}$ of an inch in thickness. By contrast, a "film" refers to a thin, membranous layer with the same planar dimensions as a sheet but with a thickness ranging from 0.001 mils to 30 mils, but preferably 0.5 mils to 20 mils, and most preferably 10 mils.

There are conventional mechanisms and apparatus that involve using colored films or sheets to create colored panels. Unlike panels constructed with embedded fabric layers, such conventional mechanisms involve no texture that is visible in panels formed with colored films. In addition, according to one conventional technology, such panels must be constructed with two co-polyester sheets made from a variety of materials, and include a backing layer, which backing layer may also be colored. Accordingly, with this technology, there are at least two interfaces where air entrapment can be a problem.

In addition, panels constructed for high-relief surfaces, when incorporated with a fabric or a printed or a colored image, may experience wrinkling of the fabric or unusual distortion of the color or image when captured between a top layer that is heavily textured and a back layer. The assembly may further require a laminating enhancing layer (LEL), in addition to thermally compatible surfaces, to achieve bonding and to facilitate the removal of air between the adjacent layers. Removal of air from the panels is important, since any air pockets that remain in a finished panel can create a notch—or point of weakness—with the laminate matrix that can result in crack propagation and failure in notch-sensitive thermoplastic materials. Applying a laminating enhancing layer tends to require additional processing steps, and increases material costs and introduces potential for contamination. In addition, the laminating enhancing layer must be uniformly applied for best results. Furthermore, the laminating enhancing layer, whether an actual film or a sprayed-on material, is not generally the same material as the substrate. Similar to fabric interlayers mentioned above, this dissimilarity contributes to the inability of such panels to be reclaimed and recycled because the dissimilar material would be a contaminant in the recycling stream for the panel substrate which constitutes the majority of the panel.

A drawback of using colored films or sheets under the conventional art is that, typically, colored films are produced in large quantities to achieve economies of scale. As a result, the customer must purchase a large quantity of a single color or image in order to obtain favorable pricing. This is compounded by the need to purchase multiple colors in order to offer a variety of color choices. Such high-volume purchase requirements can lead to unnecessary expense do to inventory obsolescence. Alternatively, a purchaser may purchase small quantities of custom colored films at a much higher price for less than full run quantities. As alluded to above, the sheets forming the substrate of the panel may themselves be colored with pigments or dyes by introducing color to the raw material during the process of sheet manufacture. Here again, economies of scale apply, requiring the purchaser to purchase high volumes of colored sheets to obtain favorable pricing or to pay extremely high prices for small quantities of custom colors.

As introduced earlier, there are a number of conventional mechanisms that involve the use of laminated translucent resin panels with a decorative image layer with or without a laminating enhancing layer. In such cases, the decorative image layer is a printed or colored film layer wherein at least one of the film layer's surfaces is colored or has an image printed thereon. In addition, the decorative image layer only occurs between outer layers. Moreover, a laminating enhancing layer may be a required element to assure adhesion of the various dissimilar layers and to facilitate removal of air from between them. Incorporating a laminating enhancing layer not only increases the processing steps and materials required, but also, such additional inputs can increase the potential occurrence of manufacturing defects or contamination within the laminate. Because the laminating enhancing layer is non-homogeneous, it typically must be carefully tested and applied to assure that proper coverage is attained for bonding to occur. Such conventional mechanisms use a backing layer, which can overcome the increased level of defects caused by the additional processing requirements, but, in the process, further increase the processing requirements. Furthermore, the backing layer may or may not be of optical quality, and could reduce the transparency or translucency, or both, of the resulting panel.

There are still other conventional mechanisms, which use colored films produced from polyvinyl butyral ("PVB") for use in glass lamination. According to such mechanisms, the colored PVB layer is used as a tie-layer to facilitate lamination of multiple glass layers. Such mechanisms, however, are usually specifically directed toward laminated glass compositions.

In addition, colored PVB films, while necessary in the laminated glass composition, may contain plasticizers, which may not be compatible with certain thermoplastics such as the copolyester known as PETG, (i.e., polyethylene-co-cyclohexane 1,4-dimethanol terephthalate), polycarbonate, or acrylic (e.g., polymethyl methacrylate, or PMMA). Furthermore, PVB tends to require special handling and storage conditions including refrigeration. Such requirements can add expense to the use of PVB in laminations. Also, plasticizers used in PVB are known to craze polycarbonate when used in laminations with polycarbonate.

Ethyl vinyl acetate (EVA) films are known to provide good bonding characteristics for laminated glass structures. Such films are available in a variety of colors from such companies as Sekesui; however, such films are not ideal for use on the surface of panels due to the fact that they attract dirt and debris, making them difficult to use. The surface tends to be very sticky and has a low surface roughness, which often requires that a vacuum be used to remove air during lamination. Further, EVA has a limitation if used to construct interior architectural paneling applications due to its relatively high flammability.

As noted above, an inherent challenge in manufacturing laminate panels is avoidance of the tendency of the panels to retain air between the layers unless preventative measures are taken to remove the air. Examples of methods used in the art for this purpose include the use of a laminating enhancing layer and/or vacuum bagging, and using an autoclave to remove the air. Use of laminating enhancing layers and/or vacuum bagging, however, requires additional lay-up and processing steps and materials, all of which increase expense.

BRIEF SUMMARY OF THE INVENTION

Implementations of the present invention include systems, methods, and apparatus related to a translucent and/or transparent polymer-based panel system that incorporates multiple colored layers. The multiple colored layers, in turn, enable manipulation of color, transparency or light transmission of the finished panel system. Implementations of the present invention also related to the construction of such panels to avoid the capture and retention of air within the panels through the use of textured surfaces at the lamination interfaces. Further implementations of the present invention relate to the application of a substantially uniform texture to a panel constructed according to the present invention. Accordingly, implementations of the present invention address a number of deficiencies and limitations in conventional commercial architectural and lighting panel systems.

For example, a thermoplastic structure in accordance with implementations of the present invention can include a substantially transparent polymer substrate and one or more colored film layers laminated thereto. The colored film layers can be laminated to the polymer substrate with the use of heat and pressure. Additionally, the colored film layers can impart color to the entire structure. Furthermore, in at least one implementation, the polymer substrate is substantially thicker than the colored film layers.

In addition, a thermoplastic structure in accordance with an implementation of the present invention can include one or more substantially transparent polymer substrates and one or more film layers adapted for fusion thereto. In this case, each of the film layers has a surface roughness that is substantially greater than a surface roughness of the one or more substrates. The surface roughness of the film layers reduces incidences of air-entrapment between the film layers and the substrates during manufacture of the structure.

Moreover, a system for creating a textured, thermoplastic structure in accordance with the present invention can include a resin panel assembly that has a resin substrate having a front surface and a back surface, one or more colored films to be laminated to at least one of the front surface and the back surface of the resin substrate, and one or more textured rollers configured to provide texture to one or more articles of the resin panel assembly. In one implementation of the system, each of the one or more textures rollers has a substantially uniformly-textured exterior shell for providing texture to the resin panel. In addition, the one or more textured rollers can be applied to the one or more articles simultaneously or sequentially.

Additional features and advantages of exemplary implementations of the invention will be set forth in the description which follows, and in part will be obvious from the description, or may be learned by the practice of such exemplary implementations. The features and advantages of such implementations may be realized and obtained by means of the instruments and combinations particularly pointed out in the appended claims. These and other features will become more fully apparent from the following description and appended claims, or may be learned by the practice of such exemplary implementations as set forth hereinafter.

BRIEF DESCRIPTION OF THE DRAWINGS

In order to describe the manner in which the above-recited and other advantages and features of the invention can be obtained, a more particular description of the invention briefly described above will be rendered by reference to specific embodiments thereof which are illustrated in the appended drawings. Understanding that these drawings depict only typical embodiments of the invention and are not therefore to be considered to be limiting of its scope, the invention will be described and explained with additional specificity and detail through the use of the accompanying drawings in which.

DETAILED DESCRIPTION OF THE PREFERRED EMBODIMENTS

Figure 1:
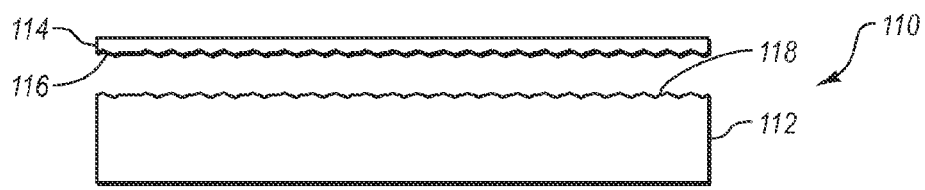
FIG. 1 illustrates a side, cross-sectional view of a panel assembly in accordance with one implementation of the present invention, detailing texture distributed over both bonding surfaces.

Implementations of the present invention include systems, methods, and apparatus related to a translucent and/or transparent polymer-based panel system that incorporates multiple colored layers. The multiple colored layers, in turn, enable manipulation of color, transparency or light transmission of the finished panel system. Implementations of the present invention also relate to the construction of such panels to avoid the capture and retention of air within the panels through the use of textured surfaces at the lamination interfaces. Further implementations of the present invention relate to the application of a substantially uniform texture to a panel constructed according to the present invention.

Accordingly, implementations of the present invention allow designers (e.g., architects, manufacturers, assemblers, etc.) to create high quality, aesthetically pleasing colored panel assemblies without requiring numerous complex process steps. In particular, panel assemblies constructed according to implementations of the present invention have few, if any, pockets of trapped air, which can lead to unsightly blemishes and diminished structural integrity of a finished panel assembly. Additionally, through selection of the number and color of film layers used to create a panel assembly according to implementations of the present invention, the color, light transmission, and color durability properties of the panel assembly can be readily customized to create a colored panel assembly tailored for a specific application or product design. Furthermore, the panel assemblies can be formed with a substantially uniform surface texture that does not tend to cause streaking of the panel assembly color. The following examples describe some example implementations of the present invention for creating such high quality, aesthetically pleasing colored panel assemblies.

Example 1

Textured Vs. Non-Textured Films

Producing fused laminate panels in open-air lamination processes can result in panels that exhibit air-entrapment, or bubbles, particularly during the fusion process when the interfacing layers of the panel just begin to fuse. Air movement restriction occurs when any layer-to-layer interface is fused together and subsequently blocks movement of air from the inner surface of the panel to the outer perimeters. Air movement restriction often occurs particularly during open-air laminations involving smooth or polished surfaces. By increasing the surface roughness of one or both interfaces to be fused in a laminated panel assembly, the amount of air trapped within a finished panel can be dramatically reduced, if not eliminated. Trapped air is not only deemed unsightly in an aesthetic panel, but it also can create interstitial sites that act as notches within the panel structure. Such notches result in potential breakage sites and can be detrimental to the physical performance of panels when used in structural applications.

Typical open-air laminations are produced with single thin-film layers without laminating enhancing layers (laminating enhancing layers) or vacuum assist. The thin-film layers typically have surface average roughness ($R_a$) values on a first and/or second surface, as measured with a POCKET SURF PORTABLE SURFACE ROUGHNESS GAUGE from MAHR FEDERAL INC., in the range of 15-20µ inches or less. Such laminations often result in finished sheets with significant air entrapment.

By increasing the surface roughness of the first and/or second surface of a thin-film layer (or multiple thin-film layers) in a laminated panel structure produced in open-air presses, it is found that the occurrence of air entrapment is significantly reduced as compared to laminated panel structures formed with thin-film layers having surface $R_a$ values in the range of 15-20µ inches or less. By way of example, multi-layer film panels, 4'×8' in dimension, were prepared with a heated-plate, open-air lamination press without the assistance of laminating enhancing layers or vacuum bagging. The structures consisted of film thicknesses ranging from 10 to 20 mils, and were assembled in conjunction with substrates of differing thicknesses. All the films possessed surface $R_a$ values greater than 50µ inches on both surfaces. The structures were fixed in place with steel plates and subjected to sufficient heat and pressure required to fuse the films to the substrates.

FIG. 1 illustrates an exploded side view of a panel assembly 110 formed with a substrate and a film having the surface $R_a$ values as described above. Specifically, panel assembly 110 is formed with a substrate 112 and a film 114. Film 114 has a surface 116 having a surface $R_a$ value greater than 50µ inches. In the illustrated embodiment, substrate 112 has a surface 118 with a surface $R_a$ value less than 10µ inches. Thus, at least one exemplary panel assembly 110 comprises one or more films 114 have a surface roughness that is greater than 20µ inches, and one or more substrates 112 with a surface roughness that is less than 20µ inches.

By way of explanation, and as understood more fully herein, any or all of the resin components in the thermoplastic substrate can comprise any number of different resin materials, and/or combinations thereof. In one implementation, for example, the film(s) 114 and substrate(s) 112 can comprise any one or more of polycarbonate materials, polyester materials (including copolyester materials), acrylic materials, and/or combinations thereof. For the purposes of this specification and claims, a polyester material refers to any one or more of PBT, PET, PETG, or PCTG, and combinations thereof. In addition, an "acrylic" material refers to PMMA or the like, whether in extruded form, or created through continuous casting, or mold-casting processes, and further includes impact-modified acrylic.

Figure 2:
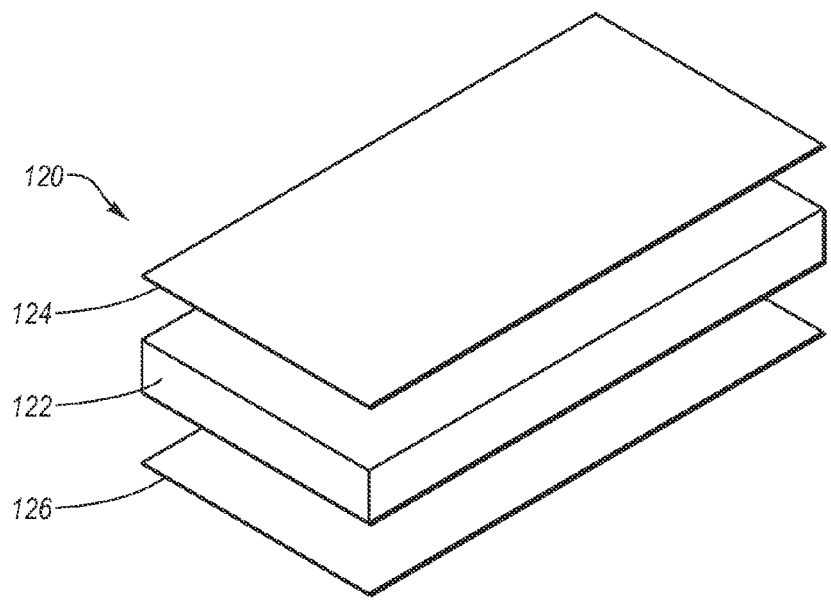
FIG. 2 illustrates a lay-up assembly of an article in accordance with an implementation of the present invention, which is configured with a colored film on each side of the substrate.
Figure 3:
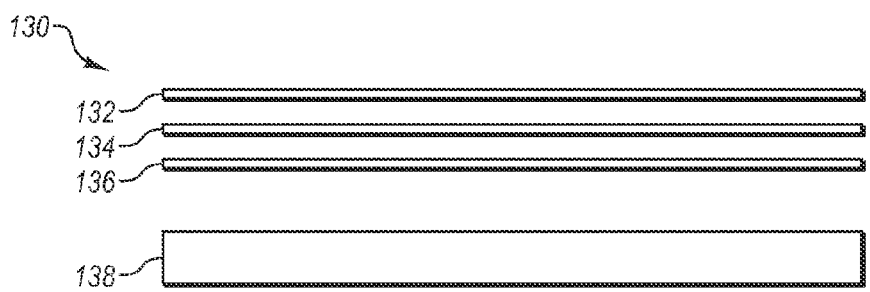
FIG. 3 illustrates an exploded, side view of a lay-up assembly with three films positioned on one side of the substrate.

FIGS. 2 and 3 illustrate lay-ups of multi-layer film panel assemblies constructed according to at least one implementation of the present invention. In particular, FIG. 2 illustrates a panel assembly 120 comprising a sheet (e.g., PETG) substrate 122 with PETG films 124 and 126 positioned on opposing sides of the PETG sheet substrate 122 for fusion thereto. Although not illustrated in FIG. 2, each of films 124 and 126 has opposing surfaces with surface $R_a$ values greater than 50µ inches, and substrate 122 has opposing surfaces with surface $R_a$ value less than 10µ inches.

While FIG. 2 illustrates two films positioned on opposing sides of a substrate, it will be appreciated that panels can be constructed in a variety of configurations. For example, a panel assembly 130 can be formed with multiple films 132, 134, and 136 fused to one or more sides of a substrate 138, as illustrated in FIG. 3. Alternatively, or additionally, one or more films can be fused between one or more substrates.

Figure 4:
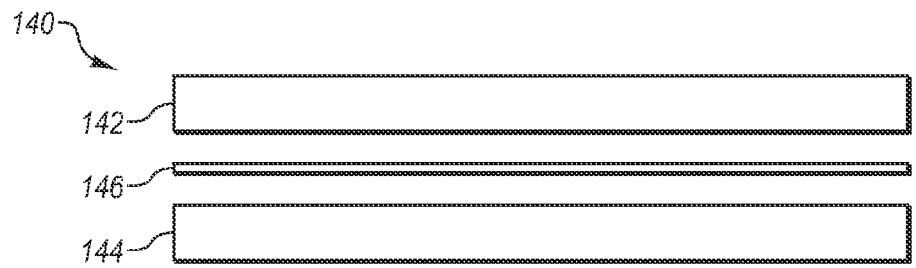
FIG. 4 illustrates an assembly configured with a colored film layer between two sheets of substrate.
Figure 5:
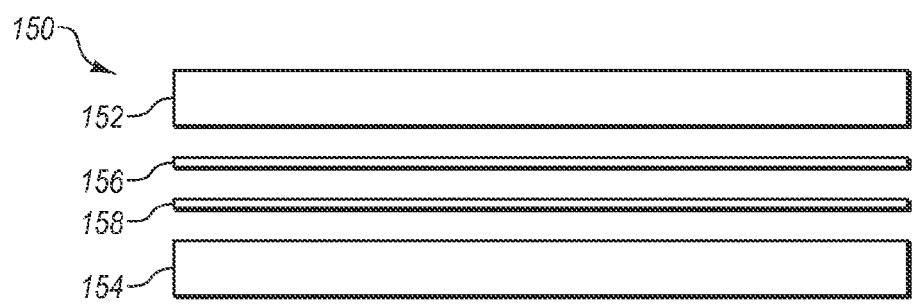
FIG. 5 illustrates an assembly configured with a colored film layer comprising two colored films between two sheets of substrate.

For example, FIG. 4 illustrates a panel assembly 140 comprising two PETG sheet substrates 142 and 144 with a film 146 disposed therebetween. More specifically, film 146 is laid between a first side surface of substrate 142 and a first side surface of substrate 144. In this manner, film 146 can be fused between opposing substrates 142 and 144. While not illustrated in FIG. 4, film 146 typically has surface $R_a$ values greater than 50µ inches on opposing surfaces, and substrates 142 and 144 each has at least one surface with a surface $R_a$ value less than 10µ inches. Similarly, FIG. 5 illustrates a panel assembly 150 with two films 156 and 158 positioned next to one another and disposed between two opposing substrates 152 and 154.

Table 1 below provides further details of the panel assembly constructions illustrated in FIGS. 2 and 4, and the resulting quality and aesthetic appearance following lamination.

TABLE 1

Translucent Thermoplastic Panel Constructs of Films with Various Average Surface Roughnesses.

| Panel | Layer 1 | Layer 2 | Layer 3 | Result |
|---|---|---|---|---|
| 1 | 0.020" PETG dual sided texture film $R_{a1}$ = 62 µin., $R_{a2}$ = 64 µin. | 0.090" PETG sheet $Ra_{1-2}$ < 10 µin. | 0.020" PETG dual sided texture film $R_{a1}$ = 62 µin., $R_{a2}$ = 64 µin. | All areas of panel free of air |

TABLE 1-continued

Translucent Thermoplastic Panel Constructs of
Films with Various Average Surface Roughnesses.

| Panel | Layer 1 | Layer 2 | Layer 3 | Result |
|---|---|---|---|---|
| 2 | 0.060" PETG sheet $R_a < 10$ μin. | 0.010" PETG dual sided texture film $R_{a1-2} > 250$ μin. | 0.060" PETG sheet $R_a < 10$ μin. | All areas of panel free of air |

$R_{a1}$—indicates average roughness on first surface.
$R_{a2}$—indicates average roughness on second surface.
$R_{a1-2}$—indicates average roughness on first and second surface identical in measure.

Example 2

Non-Homogeneous Lay-Up

A key benefit of the present invention is the ability to combine a multitude of thermoplastic film and substrate materials together to yield a finished and aesthetically pleasing structure. Any sheet substrate and colored film combination where the joining layers possess sufficient miscibility when combined via fusion at elevated temperatures can be utilized for a panel system capable of multivariate colors. Such effective lamination may occur without a laminating enhancing layer or vacuum assistance so long as the highest glass-transition temperature ($T_g$) of the heterogeneous materials is exceeded during the lamination process, and the materials are sufficiently miscible so as not to result in hazing or insufficient bonding.

For example, in one implementation, multiple panel structures were created by laminating one or more PETG sheets to one or more PVC (i.e., polyvinyl chloride) films to produce 12"×12" panel assemblies in an open-air lamination mechanical press. During the laminating process, the press operation averaged 265° F., under pressure of 40 psi, with a heat soak time of 11 minutes. The particular combinations of PETG sheets and PVC films used to create three structures according to this implementation, identified as structures A, B, and C, respectively, are detailed below.

Structure A was formed using a first layer of PVC film and a second layer of a PETG sheet. The first layer of PVC film was a translucent, non-textured, orange PVC film having a 0.010" thickness. The second layer was a 0.118" thick, clear, non-textured PETG sheet. The two layers of structure A were laminated together according to the present implementation of the invention.

Structure B was created by laminating five layers of thermoplastic film and substrate materials together according to the present implementation of the invention. The first layer comprised a 0.060" thick, clear, non-textured PETG sheet. The second layer comprised a translucent, non-textured, red PVC film with a thickness of 0.010". The third layer comprised another 0.060" thick, clear, non-textured PETG sheet. The fourth layer comprised another translucent, non-textured, red PVC film with a thickness of 0.010". Finally, the fifth layer comprised a 0.060" thick, clear, non-textured PETG sheet. In other words, structure B was formed with three 0.060" thick, clear, non-textured PETG sheets separated by 0.010" thick, translucent, non-textured, red PVC films.

Similarly, structure C was created by laminating five layers of thermoplastic film and substrate materials together according to the present implementation of the invention. The first layer comprised a 0.060" thick, clear, non-textured PETG sheet. The second layer comprised a translucent, non-textured, red PVC film with a thickness of 0.010". The third layer comprised a 0.118" thick, clear, non-textured PETG sheet. The fourth layer comprised a translucent, non-textured, orange PVC film with a thickness of 0.010". Finally, the fifth layer comprised a 0.060" thick, clear, non-textured, PETG sheet.

For all three structures, A-C, no panel exhibited shadows or air gaps within the panel that would exemplify delamination or insufficient bonding. Further, each of structures A-C were produced with two dissimilar but relatively miscible materials, PVC and PETG, and were adequately fused together at elevated temperatures above the respective material's $T_g$ (PVC film $T_g$ ~185° F. and PETG $T_g$ ~176° F.) without the assistance of a laminating enhancing layer or vacuum.

In a second example of dissimilar materials being laminated to form a single panel structure, a polycarbonate sheet was fused to a PETG film to produce a 12"×12" panel in an open-air lamination mechanical press. The press operation averaged 330° F., under pressure of 40 psi, with a heat soak time of 15 minutes. The particular polycarbonate sheet and PETG film combinations used to create two of the structures according to this implementation are identified as structures D and E, respectively, and are detailed below.

Structure D was formed using a first layer of PETG film and a second layer of a polycarbonate sheet. The PETG film was a translucent, 2-sided textured, blue PETG film with a 0.010" thickness. The second layer of polycarbonate sheet was a 0.236" thick, clear, non-textured Polycarbonate sheet. Structure D was created by laminating the two layers together according to implementations of the present invention.

Likewise, structure E was formed using a first layer of PETG film and a second layer of a polycarbonate sheet. The PETG film was a translucent, 2-sided textured, blue PETG film with a 0.010" thickness. The second layer of the polycarbonate sheet was a 0.118" thick, clear, non-textured polycarbonate sheet. The two layers of structure E were laminated together according to the present implementation of the invention.

Although polycarbonate and PETG are not considered "thermally compatible" due to the wide disparity in $T_g$ between the materials (PETG film $T_g$ ~176° F. and Polycarbonate $T_g$ ~300° F.), the polycarbonate and PETG layers of each of structures D and E were combined to form aesthetically pleasing laminated panel assemblies with good adhesion, and no evidence of insufficient bonding or distortion.

In a final example of dissimilar materials being laminated to produce a single panel structure, identified as structure F, a PETG sheet ($T_g$ ~176° F.) was laminated to three PCTG (i.e., glycol modified poly-cyclohexylene-dimethylene terephthalate) films ($T_g$ ~187° F.) to produce 12"×12" panel assemblies in an open-air lamination mechanical press. The press operation averaged 265° F., under pressure of 40 psi, with a heat soak time of 10 minutes. The PETG sheet used to create structure F comprised a 0.500" thick, clear, non-textured PETG sheet. Each of the three PCTG films used to form structure F comprised a translucent, white, single-side textured PCTG film with a 0.010" thickness. In forming structure F, the three PCTG film layers were laminated to one side of the PETG sheet.

As with the previous examples, structure F, though produced with multiple PCTG films and a PETG sheet, was sufficiently bonded with no evidence of delamination of the PCTG films from the PETG sheet.

Example 3

Multivariate Coloring of Panel Assemblies

Different colored films, ranging from 0.001" to 0.030" in thickness, more preferably in a range of 0.005" to 0.020" in thickness, and most preferably from 0.010" to 0.015" in total thickness, can be thermally combined to make a single, uniformly colored panel assembly. The thermoplastic film layers may be positioned separately on the outermost surfaces of any clear thermoplastic substrate that is miscible with the thermoplastic film of any gauge, so long as the substrate is clear, transparent and has a clear or neutral color. Or, the thermoplastic films may be positioned conjointly on a single surface of the same substrate without significant change to the overall surface color of the panel assembly.

Figure 6:
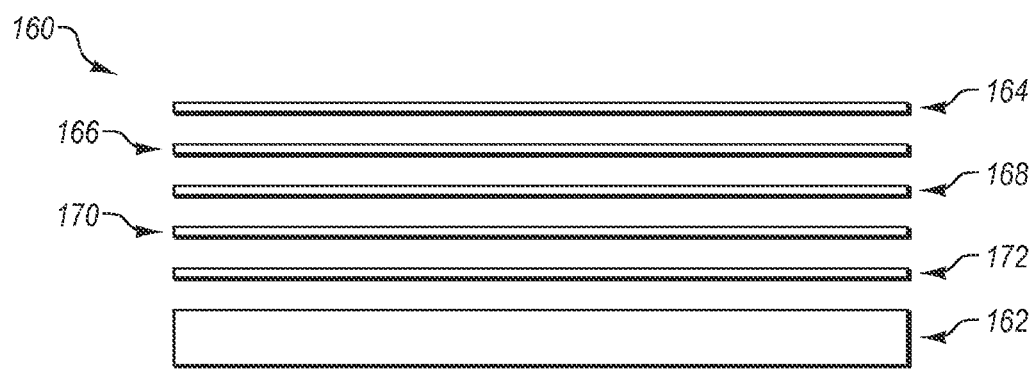
FIG. 6 illustrates a lay-up assembly comprising a plurality of films positioned on one side of a substrate, which is configured to increase the resident depth of the colored films.

Combination through lamination or adhesion of such film layers of differing colors creates a uniform colored panel assembly that is a composite color of the individual film colors used to construct the panel assembly. Furthermore, the color ordering of two or more colored films is not important as the color and hue of the panel remains the same throughout the finished panel regardless of viewing direction and ordering of the films on or within the substrate. For example, FIG. 6 illustrates a panel assembly 160 that is configured with a substrate 162, and multiple films 164, 166, 168, 170, and 172 to be fused thereto. In the illustrated example in FIG. 6, the multiple films 164, 166, 168, 170, and 172 are configured to be fused to the same surface of substrate 162, and comprise three colored films 164, 168, and 172, and two transparent films 166 and 170 positioned between colored films 164, 168, and 172. As discussed herein, however, multiple films and/or substrates can be ordered in any manner, or left out entirely, to alter the color, hue, color durability, or other properties of the panel assembly as desired.

In one implementation, laminated thermoplastic panels were produced from colored PETG and PCTG films possessing a total thickness of 0.010". All films were textured on the front and back surface with a surface $R_a$ value of 65μ inches as measured with a POCKET SURF PORTABLE SURFACE ROUGHNESS GAUGE from MAHR FEDERAL INC. The optical properties of these films were measured with a HUNTERLAB COLORQUEST XE spectrophotometer with the TTRANS scanning method. The color measures of each base film were measured and quantified with the respective L*, a*, b*, haze and percent light-transmission values as reported from the spectrophotometer measurements. Table 2 lists the color and optic measurements and provides a description of each film layer used in these examples.

TABLE 2

| Associated Color and Optics Measures of Experimental Colored Films. | | | | | |
|---|---|---|---|---|---|
| Color Name (description) | L* | a* | b* | Haze | % Light Transmission |
| POMEGRANATE (dull red PETG film) | 52.05 | 49.82 | 14.62 | 77.68 | 20.19 |
| ALLURE (deep blue PETG film) | 55.44 | −1.69 | −34.76 | 80.25 | 23.36 |
| LAWN (emerald green PETG film) | 84.37 | −29.41 | 38.47 | 79.24 | 64.78 |
| WHITE (translucent white PCTG film) | 86.96 | −10.85 | 41.04 | 66.84 | 65.42 |

Laminate structures of two different gauges were produced with films listed by the color names described in Table 2 to ascertain the aesthetic affect that orientation of the films has on the overall panel. Table 3 provides detailed lay-ups of the several combinations of color, gauge and color-film-layer positioning with respect to the panels.

TABLE 3

| Panel Lay-ups for Directional Color Measurement Comparison Exhibits. | | | | |
|---|---|---|---|---|
| Sample Number | Surface 1 (front) | Surface 2 | Surface 3 | Surface 4 (back) |
| A | 0.030" Clear PETG film | 0.010" ALLURE PETG film | 0.010" POMEGRANATE PETG film | 0.030" Clear PETG film |
| B | 0.010" ALLURE PETG film | 0.060" Clear PETG sheet | 0.010" POMEGRANATE PETG film | NA |
| C | 0.500" Clear PETG sheet | 0.010" ALLURE PETG film | 0.010" POMEGRANATE PETG film | 0.500" Clear PETG sheet |
| D | 0.010" ALLURE PETG film | 0.500" Clear PETG sheet | 0.500" Clear PETG sheet | 0.010" POMEGRANATE PETG film |
| E | 0.010" POMEGRANATE PETG film | 0.060" Clear PETG sheet | 0.010" LAWN PETG film | NA |
| F | 0.010" POMEGRANATE PETG film | 0.500" Clear PETG sheet | 0.500" Clear PETG sheet | 0.010" LAWN PETG film |

The panel assemblies in Table 3 above were laminated in a mechanical heat press in 4"×4" plaques, and then measured for color with a HUNTERLAB COLORQUEST XE spectrophotometer (TTRANS method). Each sample was measured from both the front and back surfaces facing the spectrophotometer light source to compare for directional differences. The results are depicted in Table 4.

TABLE 4

Directional Measures of Dissimilar Color Film Layers Laminated as a Single Assembly.

| Sample Number | Measurement Direction | L* | a* | b* |
|---|---|---|---|---|
| A | Front | 31.26 | 36.14 | −12.79 |
| A | Back | 31.37 | 36.15 | −12.88 |
| B | Front | 31.74 | 35.21 | −14.05 |
| B | Back | 31.78 | 35.14 | −14.18 |
| C | Front | 33.18 | 33.73 | −11.57 |
| C | Back | 34.07 | 33.15 | −12.03 |
| D | Front | 29.62 | 34.34 | −11.73 |
| D | Back | 30.25 | 34.43 | −11.62 |

TABLE 4-continued

Directional Measures of Dissimilar Color Film Layers Laminated as a Single Assembly.

| Sample Number | Measurement Direction | L* | a* | b* |
|---|---|---|---|---|
| E | Front | 45.56 | 29.99 | 36.44 |
| E | Back | 46.22 | 29.77 | 36.03 |
| F | Front | 42.15 | 28.36 | 34.57 |
| F | Back | 41.88 | 27.85 | 33.79 |

As shown in Table 4, all sample color measurements, regardless of color, gauge or film positioning within a sample construct show significantly identical L*, a* and b* color values when measured from the front and the back surfaces of the sample constructs. These measurements confirm that the color is uniform throughout the panel, despite opposing colors being on opposing surfaces of a given panel assembly.

Example 4

Manipulation of Color Intensity with a Multiplicity of Layers

Implementations of the present invention further comprise controlling the color intensity of a panel assembly with the addition of multiple film layers of the same color. To exemplify the relative intensity effect that can be achieved with the addition of multiple colored film layers in a laminated panel, samples were produced with colored films as detailed in Table 2. Such layering enables end users to control the intensity of color of finished panels through simple addition of same color layers. In the case of this example, sample structures were produced from PETG films and sheets with an open-air lamination press under conditions sufficient for bonding materials together without the use of a laminating enhancing layer (~250° F. for 10 minutes at 40 psi). The configurations of colored films and sheets utilized to produce the example structures are listed in Table 5 below. The data presented in Table 6 is representative of the resultant color of the structures as measured with a HUNTERLAB COLORQUEST XE spectrophotometer.

TABLE 5

Panel Configurations Produced with Multiple Homogeneous Color Layers

| Sample Number | Surface 1 (front) | Surface 2 | Surface 3 | Surface 4 | Surface 5 (back) |
|---|---|---|---|---|---|
| G | 0.500" Clear PETG sheet | 0.010" POMEGRANATE PETG film | 0.500" Clear PETG sheet | NA | NA |
| H | 0.500" Clear PETG sheet | 0.010" POMEGRANATE PETG film | 0.010" POMEGRANATE PETG film | 0.500" Clear PETG sheet | NA |
| I | 0.500" Clear PETG sheet | 0.010" POMEGRANATE PETG film | 0.010" POMEGRANATE PETG film | 0.010" POMEGRANATE PETG film | 0.500" Clear PETG |
| J | 0.010" LAWN PETG film | 0.500" Clear PETG sheet | NA | NA | NA |
| K | 0.010" LAWN PETG film | 0.010" LAWN PETG film | 0.500" Clear PETG | NA | NA |
| L | 0.010" LAWN PETG film | 0.010" LAWN PETG film | 0.010" LAWN PETG film | 0.500" Clear PETG sheet | NA |

TABLE 6

Resultant Color Measures of Panels Produced with Multiple Color Layers.

| Sample | L* | a* | b* | Light Transmission |
|---|---|---|---|---|
| G | 56.56 | 44.5 | 10.76 | 24.47 |
| H | 37.67 | 52.87 | 25.17 | 9.91 |
| I | 28.20 | 49.26 | 33.46 | 5.45 |
| J | 82.49 | −34.42 | 37.89 | 61.2 |
| K | 76.54 | −44.2 | 51.15 | 50.77 |
| L | 70.34 | −52.92 | 56.72 | 41.23 |

As is shown with the data in Table 6, increasing the film layers has a predictable effect on L* and light transmission. That is, as the number of color film layers increases, the apparent "darkness" (as characterized by decreasing L* and decreasing light transmission) of the panel increases accordingly. While there is movement in the a* (red to green axis) and b* (blue to yellow axis) values of the samples, the relative hue of the color stays intact upon visual inspection, and the colors show an increase in intensity in accordance with the decrease in light transmission.

Example 5

Manipulation of Light Transmission and Diffusion Performance

Implementations of the present invention further comprise controlling the panel optical properties with the addition of translucent "WHITE" film layers. Such control of light transmission and diffusion properties is often important in the design of artificial and day-lighting systems with respect to spreading light across a panel and creating a desired lighting effect.

To demonstrate the effects of varying light transmission, 4"×4" sample panels were assembled and fused as described by the configurations listed in Table 7. Lamination was conducted in an open-air lamination press at approximately 265° F. for 10 minutes at 40 psi, which can constitute appropriate bonding conditions for laminating one or more PCTG films to a PETG sheet. The base "WHITE" film was produced from PCTG and is characterized in Table 2.

TABLE 7

Panel Configurations Produced with Multiple White Color Layers.

| Sample | Surface 1 (front) | Surface 2 | Surface 3 | Surface 4 (back) |
|---|---|---|---|---|
| M | 0.010" WHITE PCTG film | 0.060" Clear PETG sheet | NA | NA |
| N | 0.010" WHITE PCTG film | 0.010" WHITE PCTG film | 0.060" Clear PETG sheet | NA |
| O | 0.010" WHITE PCTG film | 0.010" WHITE PCTG film | 0.010" WHITE PCTG film | 0.060" Clear PETG sheet |

The color, light transmission and haze responses, as measured with a HUNTERLAB COLORQUEST XE spectrophotometer (TTRANS setting), of the samples listed in Table 7 are represented in Table 8.

TABLE 8

Color and Optical Measurements of Panels with Multiple Layers of Translucent White Film.

| Sample | L* | A* | B* | Haze | Light Transmission |
|---|---|---|---|---|---|
| M | 81.56 | 2.81 | −2.53 | 90.84 | 59.48 |
| N | 74.58 | 3.04 | −2.59 | 97.80 | 47.61 |
| O | 69.67 | 3.20 | −3.33 | 99.08 | 40.28 |

Similar to the ability to increase panel color intensity with the addition of multiple layers of colored films, increasing the number of translucent "WHITE" film layers has a significant effect on the overall light transmission and diffusion (as characterized by haze) properties that are exhibited in a translucent laminated panel. Further, the results in Table 8 also point to a consistency of color hue that is characterized by the small differences among the measured a* and b* values of samples produced with one, two, and three layers of translucent "WHITE" film.

The practice of the present invention lends itself well as a tool for designers and specifiers of interior lighting and panel systems. Having the ability to manipulate the light transmission and diffusion (haze) properties of a panel allows one to control the amount of light scattering, and the ultimate aesthetic lighting effect that occurs at the panel surface. Increasing the haze value, by increasing the number of translucent "WHITE" layers, allows designers to manipulate the transparency of a lighting and panel system to achieve the desired visual effects in a lighting application, regardless if the light source in the application is from artificial light sources (incandescent, fluorescent, LED, halogen, etc.) or natural daylight.

An added feature can be introduced with one or multiple translucent "WHITE" film layers laminated in conjunction with colored film layers. Table 9 demonstrates that the change in the light transmission and the diffusion characteristics created by translucent "WHITE" film layers in a laminated panel can be utilized in conjunction with panels that contain colored film layers. When translucent "WHITE" films are combined with colored film layers, one has the ability to modify the light transmission and the diffusion characteristics of a panel with little effect on the overall panel color.

In the example case represented in Table 9, a first panel of 1/32" nominal thickness was constructed in an open-air lamination press with a 0.010" thick first surface layer of "ALLURE" blue film (as described in Table 2) laminated to a 0.060" thick layer of clear PETG sheet. A second panel was constructed with the same 0.010" thick "ALLURE" blue film on the first surface and a second layer of 0.010" "WHITE" PCTG film (as described in Table 2) laminated to a 0.060" thick layer of clear PETG sheet. The data in Table 9 shows that the incorporation of a "WHITE" translucent film layer, even with a color, has a dramatic effect on the haze and light transmission of the panel. Despite the large change in light transmission and haze values, the "WHITE" translucent film layer imparts only a slight difference to the overall color hue (as represented by the a* and the b* values) between the color-only sample and the sample with a color layer and a "WHITE" diffuser layer.

TABLE 9

Fused Colored Panels Produced With and Without a Translucent White Diffusing Layer.

| Panel lay-up | L* | a* | b* | Haze | Light Transmission |
|---|---|---|---|---|---|
| Blue + Clear | 63.63 | −3.74 | −31.26 | 8.63 | 32.34 |
| Blue + WHITE + Clear | 48.33 | −0.14 | −26.42 | 82.71 | 17.06 |

Example 6

Laminated Panels with Colored Films Used in Combination with Neutral Fabrics Additional implementations of the present invention include the ability to add color to neutral (clear or white) fabric inserts through the fusion of colored film layers to the fabric layers. To this end, samples (4"×4") of such laminations were produced with fabrics, and with colored films combined with fabrics, in an open-air lamination press. The configurations of the samples produced are described in Table 10. Laminated panels with only fabric inserts were included for the purpose of comparison to laminated panels containing both fabrics and colored film layers. The "LAWN" color identified in Table 10 is the same material as previously characterized in Table 2.

TABLE 10

Constructs of Panels Containing Fabrics and Fabrics with Colored Film Layers

| Sample | Surface 1 (front) | Surface 2 | Surface 3 | Surface 4 | Surface 5 (back) |
|---|---|---|---|---|---|
| P | 0.236" Clear PETG sheet | Clear Sheer fabric | 0.236" Clear PETG sheet | NA | NA |
| Q | 0.236" Clear PETG sheet | White Voile fabric | 0.236" Clear PETG sheet | NA | NA |
| R | 0.236" Clear PETG sheet | White Taffeta Fabric | 0.236" Clear PETG sheet | NA | NA |
| S | 0.236" Clear PETG sheet | 0.010" LAWN PETG film | Clear Sheer fabric | 0.010" LAWN PETG film | 0.236" Clear PETG sheet |
| T | 0.236" Clear PETG sheet | 0.010" LAWN PETG film | White Voile fabric | 0.010" LAWN PETG film | 0.236" Clear PETG sheet |
| U | 0.236" Clear PETG sheet | 0.010" LAWN PETG film | White Taffeta fabric | 0.010" LAWN PETG film | 0.236" Clear PETG sheet |
| V | 0.010" LAWN PETG film | 0.236" Clear PETG sheet | White Voile fabric | 0.236" Clear PETG sheet | 0.010" LAWN PETG film |

The resultant panels were measured for color and optical response in a HUNTERLAB COLORSCAN XE spectrophotometer (TTRANS setting). The measurement results are listed in Table 11.

TABLE 11

Color and Optical Measurements of Laminated Panels Containing Fabrics With and Without Color Film Layers.

| Sample | L* | a* | b* | Haze | Light Transmission |
|---|---|---|---|---|---|
| P | 91.08 | 0.07 | 0.78 | 5.62 | 78.66 |
| Q | 79.13 | 0.51 | 1.04 | 17.65 | 55.15 |
| R | 49.54 | 1.47 | 0.62 | 82.95 | 18.03 |
| S | 74.65 | −42.94 | 50.45 | 24.31 | 47.73 |
| T | 63.79 | −37.69 | 45.52 | 37.84 | 32.54 |
| U | 33.5 | −25.43 | 30.13 | 97.81 | 7.77 |
| V | 63.94 | −37.63 | 44.39 | 24.11 | 48.76 |

The data in Table 11 exemplifies the aesthetic differences between the sheer, voile and taffeta fabrics in terms of color, haze and light transmission. These differences create unique panel aesthetics and lighting effects when laminated into single panel constructions and used in applications that are either lighted or serve as a light-diffusing medium of daylight or artificial lighting. Comparison of samples P to S, Q to T, and S to V show the effect that the color film layers impart onto the fabric layer, and the structure as a whole, laminated into a single panel.

Of significance is a comparison of sample S from Table 11, which is produced with 2 layers of the "LAWN" color film in contact with a white voile fabric, with sample K from Table 6, which is the same total thickness and also produced with two layers of the same "LAWN" color film. The resultant panel colors as characterized by the measured L*, a* and b* values are virtually identical with the only difference being a reduction in the light transmission of sample S, which is due to the fabric. Such a result demonstrates that the color of the film does translate to the fabric to create the effect of a pre-colored fabric.

Samples T and V of Table 11 further demonstrate that the placement of the colored film layer, or layers, with respect to the position of fabric in the laminated panel structure has no effect on the overall measured color values obtained from a laminated panel. This result demonstrates that the colored film layers do not have to be in direct contact with the fabric layer to impart a consistent color appearance to the fabric.

In addition to creating a colored panel as described herein, a manufacturer can apply a texture to any one or more of the films, substrates, and/or film/substrate laminate combinations for any number of purposes. In at least one implementation, and as previously described, the manufacturer can apply texture to one or more films and/or one or more substrates before lamination in order to ensure appropriate air removal between the film(s) and substrate(s) during lamination. In addition, the manufacturer can apply texture to a substrate/film laminate combination for a variety of aesthetic purposes (e.g., better diffusion, avoidance of color streaking, etc.)

In conventional cases, a manufacturer will typically provide texture to a panel by including a texture paper as one of the various layers in the forming/laminating process. For example, in addition to the layers shown in FIG. 4, a manufacturer might further include a texture paper layer on a surface of substrate 142 and/or 144; or, with respect to the layers shown in FIG. 1, the manufacturer might further include the texture paper layer on top of the film layer 114, which is on top of the substrate. In some cases, however, depending on one or more of the film layers and the granularity of the texture paper, this sort of application of texture can result in uneven air removal in the functional sense, or uneven streaking of colors in the aesthetic sense. This tends to occur particularly if the manufacturer subsequently laminates the panel with yet another color film layer.

With respect to the color/aesthetic aspect, one reason for such streaking may include the notion that the texture granules on the texture paper are somewhat randomly aligned, which means that, in some cases, valleys and peaks can form that provide some of the color film inks a conduit for streaking during lamination. A similar effect can be observed with respect to using texturing in order to remove air from between film and/or substrate layers. That is, random or less-than-ideal distribution of texture granules, can result in texturing of the film and/or resin substrates that entraps air in the final panel, and thus results in a final panel with reduced aesthetic qualities.

Accordingly, implementations of the present invention further include one or more apparatus and methods for applying texture to films, substrates, and/or completed panels while minimizing or outright eliminating any potential for air entrapment, and/or color streaking in such panels. This can be done at least in part by providing a much more uniform distribution of texture granules on a texture applicator. In at least one implementation, applying this distribution can be done at least in part by using a textured roller to apply texture to a colored film, substrate, and/or completed panel, whereby the textured roller imparts a highly uniform texture. The manufacturer can then apply the textured film to the substrate (which may also be textured using similar or identical mechanisms). During lamination, as described herein, the uniformly-applied texture one or all of the given surfaces can then provide for sufficient air removal between surfaces on the one hand, and/or avoid any color streaking on the other hand.

Figure 7A:
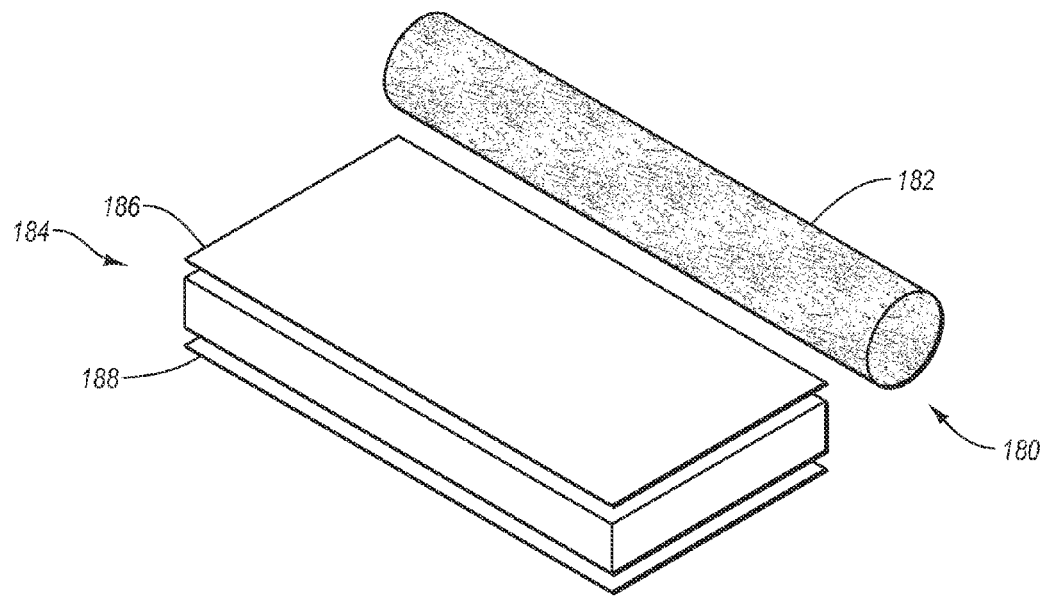
FIG. 7A illustrates a panel assembly configured with a colored film on each side of a substrate, and a texture roller used to apply texture to the panel assembly.
Figure 7B:
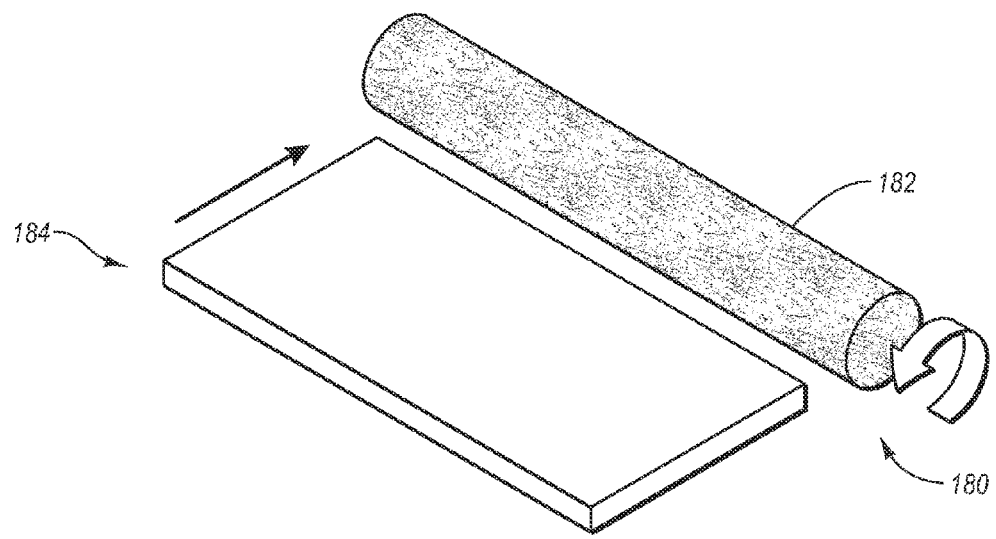
FIG. 7B illustrates the panel assembly of FIG. 7A, with the colored films bonded to the substrate, and prior to the texture roller applying texture to the panel assembly.
Figure 7C:
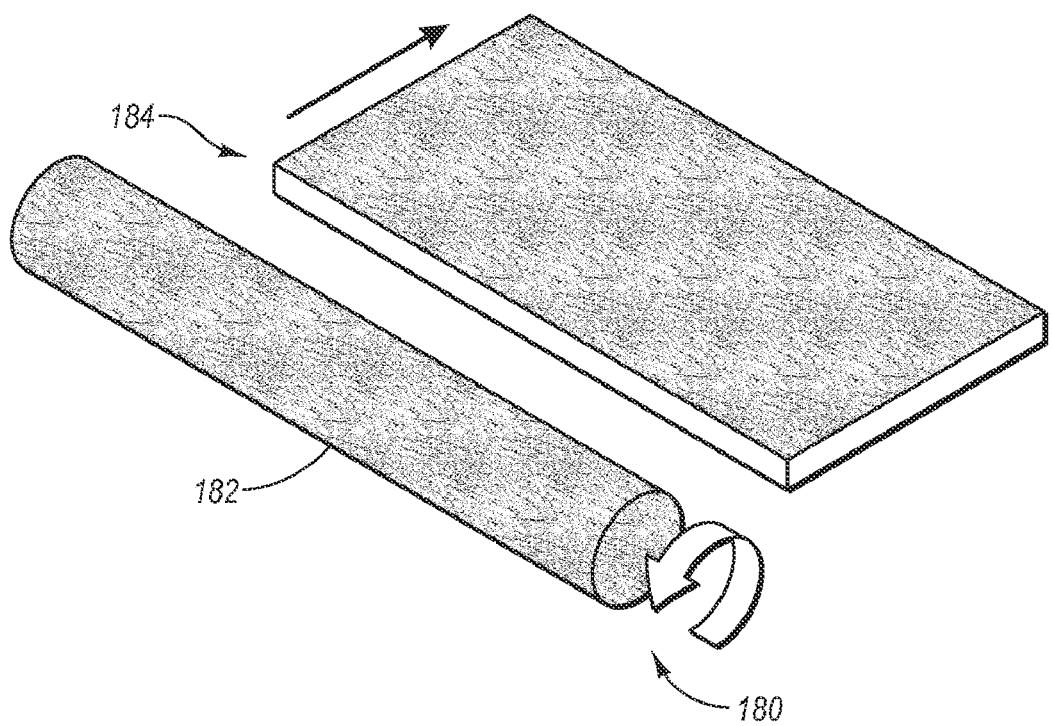
FIG. 7C illustrates the panel assembly of FIG. 7B after the texture roller has applied texture to the panel assembly.

Along these lines, FIGS. 7A-7C illustrate various schematic diagrams for applying texture in accordance with an additional or alternative implementation of the present invention using a textured roller. In the illustrated case, FIGS. 7A-7C show components in a process for producing a finished lamination product for aesthetic effects. Such illustration, however, is primarily by way of convenience, as the mechanism for lamination is essentially the same whether providing texture to an individual film or an individual substrate prior to lamination, such as to achieve improved air removal effects.

In either case, a texture-applying roller 180 (or textured roller) can comprise a cylinder having a double wall, spiral baffle using mild steel construction. In such a case, this roller can further comprise an outer shell 182 produced from 4140 stainless steel that has been hardened to 52-54 Rc ("Rockwell Hardness.") In at least one implementation, the roller size can be about a 16" diameter with a 66" face, and can be prepared with a plurality of different textures. In at least one implementation, for example, the roller is prepared (e.g., sandblasted or engraved) with a texture of having a $R_a$ value of 150μ inches, and, in another implementation, the roller is prepared (e.g., sandblasted or engraved) with a texture having a $R_a$ value of 250μ inches.

At least one method of applying texture, therefore, includes first obtaining the article to be textured (e.g., the colored film, the resin substrate, or completed panel). If texturing a completed panel, such as illustrated in FIG. 7A, the manufacturer first prepares colored panel 184 using one or more colored films 186 and 188. In particular, as previously described, a manufacture can form or laminate one or more colored films to one or more surfaces of a resin substrate (e.g., polycarbonate, acrylic, co-polyester, etc.). Of course, one will appreciate that, as also previously described, the articles (i.e., the substrate article and one or more color film articles) will be at least partially translucent. Nevertheless, FIG. 7A illustrates the substrate and films without translucence/transparency effects for purposes of convenience in illustration.

As shown in FIG. 7B, however, the lamination of the one or more color film articles to the substrate article results in an at least partially translucent article (e.g., panel 184) that bears the color (or color combination) presented by the applied color film layers. If the article to be textured is simply a colored film alone, however, FIG. 7B similarly can be construed as representing a colored film article or a basic resin substrate article prior to lamination. Specifically, FIG. 7B illustrates the translucency of any given article (e.g., laminated/colored panel 184) prior to applying texture.

In either case, the texturing process begins by heating the surface of the panel to above the material's $T_g$. The manufacturer then passes the article (e.g., laminated/colored panel 184, or just film 186 and/or 188) through the one or more textured rollers 180, which have been chosen based on the texture or surface roughness of the given roller 180 (or set of rollers). As shown in FIG. 7C, passing the given article (e.g., panel 184, or films 186 and/or 188) through the one or more textured rollers 180 results in application of the texture (i.e., in inverted form) from the roller 180 to the panel 184 and/or film(s) 186/188. Following transfer of the roller texture to the article, the manufacturer allows the textured article to cool below the $T_g$ to complete the texturing process. If texturing the films 186/188 articles separately, the manufacturer can then laminate the now-textured film articles 186/188 to the resin substrate 184 article, as previously described herein.

On the one hand, if the manufacturer has only textured the exposed side of the colored film (or laminated panel), the resulting product is a thermoplastic panel such as shown in FIG. 7C, in which a resin thermoplastic panel comprises a textured film laminated to a base resin substrate 184. On the other hand, if the manufacturer has only applied textured to an inside surface of a film article that is placed directly against the surface of the resin substrate article, the texturing shown in FIG. 7C will be less visible (or potentially invisible). One will appreciate in either case that because the roller 180 is prepared carefully with a uniform distribution of texture granules, and because the roller 180 provides a continuous and repeated application of the texture granulation, the ultimate, laminated end product is virtually ensured to have a uniform distribution of texture thereon. This, in turn, can minimize or outright avoid any air entrapment, and/or avoids color streaking that could accompany application of the color film(s) (particularly subsequent color films laminated on top of the textured surface(s)).

As a final matter, one will appreciate that a manufacturer can apply multiple rollers to a given article in order to impart texture. With a color film article (or non-laminated substrate article), for example, the manufacture may desire to achieve the air removal benefits of texturing on one side of the colored film, but also achieve the benefits of avoiding color streaking on the other side of the film article. With a laminated panel article, the manufacturer may desire to achieve the above-described aesthetic benefits on both sides of the finished panel.

In addition, there may be other reasons in which a manufacturer may desire to apply multiple different rollers on the same side of the article to achieve still other aesthetic or performance effects. Furthermore, the manufacturer may apply texture on opposing sides of the given article with opposing rollers, or simply turn the article over after application of texture on one side and then apply texture to the second side of the article. Accordingly, illustration of a single textured roller to a single side of a given article is done by way primarily of convenience, and thus should not be construed as limiting. In any event, and as previously mentioned, the manufacturer may even apply still additional color films on top of the textured surface(s), and further pass the article again through texturing (on top of the new color films).

The present invention thus may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes that come within the meaning and range of equivalency of the claims are to be embraced within their scope.

I claim:

1. A method of preparing a laminate resin structure having a custom color created from a plurality of colored films, comprising:
   providing a translucent resin substrate having opposing first and second bonding surfaces that correspond with opposing first and second viewable surfaces, and a glass transition temperature;

aligning a bonding surface of a first colored film directly against a bonding surface of the resin substrate, wherein the first colored film is miscible with the bonding surface of the resin substrate, and comprises a glass transition temperature;

aligning a second colored film about an outside surface of the first colored film, wherein the second colored film is miscible with at least the first colored film, and comprises a glass transition temperature; and applying heat and pressure to meet or exceed the highest glass transition temperature of the resin substrate, the first colored film, and the second colored film, such that the resin substrate intermixes with one or both of the first and second colored films to display a third color substantially throughout the resin substrate, regardless of ordering of the first and second colored films on the translucent resin substrate;

wherein the third color is a composite of the colors of the first and second colored films.

2. The method as recited in claim 1, wherein at least the first colored film comprises a texture on the bonding surface that is different from a texture of the bonding surface of the resin substrate.

3. The method as recited in claim 2, wherein the texture of the first and second colored film comprises a uniform surface roughness that is greater than the surface roughness of the resin substrate.

4. The method as recited in claim 2, wherein:
the texture of the first and second colored film comprises a uniform surface roughness that is greater than 20µ inches; and
the texture of the resin substrate comprises a uniform surface roughness that is less than 20µ inches.

5. The method as recited in claim 2, wherein:
the texture of the first and second colored film comprises a uniform surface roughness that is greater than 62µ inches; and
the texture of the resin substrate comprises a uniform surface roughness that is less than 10µ inches.

6. The method as recited in claim 1, further comprising:
positioning a white film about a bonding surface of the resin substrate or a surface of one of the first or second colored films;
wherein, after the application of heat and pressure, the white film provides a first haze value to the resultant third color.

7. The method as recited in claim 6, further comprising:
positioning a second white film about a bonding surface of the resin substrate or one of the first or second colored films before application of heat and pressure;
wherein, the combination of the first and second white films results in a laminate structure having a second haze value that is greater than the first haze value.

8. The method as recited in claim 1, wherein the translucent resin substrate comprises a material selected from the group consisting of polycarbonate, polyester, PVC, acrylic, and combinations and polymer alloys thereof.

9. The method as recited in claim 1, wherein:
the color of one or both of the first or second colored films comprises a printed image; and
a difference in surface roughness between opposing surfaces at a bonding interface between the resin substrate and first colored film, or at a bonding interface between the first and second colored films, allows for evacuation of air while preventing color streaking.

10. The method as recited in claim 1, wherein the second colored film further comprises a texture on an opposing surface that is different from the bonding surface.

11. The method as recited in claim 10, wherein the translucent resin substrate further comprises a textured finish on a non-bonding surface.

12. The method as recited in claim 1, wherein the first and second colored films comprise the same color, such that the new third color comprises the color of the first or second colored film at greater intensity.

13. A method of preparing a laminate resin structure devoid of air entrapment or color streaking, comprising:
providing a resin substrate having a uniform texture with a first surface roughness on a bonding surface;
providing a colored film that is miscible with the resin substrate, and that has a uniform texture with a second surface roughness on a bonding surface, wherein the second surface roughness is different from the first surface roughness;
positioning the resin substrate and the colored film so that the textures of the bonding surfaces of the resin substrate and the colored film are in direct contact with each other; and
applying heat and pressure to the positioned resin substrate and colored film so that the resin substrate and colored film intermix, wherein, during application of heat and pressure, the uniform textures of the in-contact bonding surfaces allow air removal from between the resin substrate and the colored film while preventing color streaking; and
applying a textured finish to a non-bonding surface of the resin substrate.

14. The method as recited in claim 13, further comprising:
providing a textured finish to a non-bonding surface of the colored film;
wherein the textured finish on the non-bonding surfaces of the resin substrate and colored film cooperate to enhance diffusion of light in the laminate resin structure.

15. The method as recited in claim 13, further comprising:
identifying a preferred light diffusion characteristic of the laminate resin structure; and
identifying a number of one or more white film layers needed to create the light diffusion characteristic.

16. The method as recited in claim 15, further comprising positioning the one or more identified white film layers about an assembly comprising the resin substrate and positioned colored film prior to applying heat and pressure.

17. The method as recited in claim 13, wherein:
the surface roughness of the colored film layer is greater than the surface roughness of the resin substrate layer.

18. The method as recited in claim 13, wherein assembly of the positioned resin substrate and the colored film is devoid of a laminating enhancing layer.

19. The method as recited in claim 13, further comprising applying heat and pressure through a lamination press.

20. The method as recited in claim 13, wherein the color of one or both of the first or second colored films comprises a printed image.

21. The method as recited in claim 13, further comprising:
providing one or more additional colored films that are miscible with one or both of the colored film or the resin substrate;
wherein the colored film and the one or more additional colored films are fused to the resin substrate, such that the prepared laminate structure displays a third color throughout the resin substrate that is a composite of the colors of the colored film and the one or more additional colored films.

22. The method as recited in claim 21, the one or more added colored films comprise the same color as the provided colored film, such that the third color comprises the color of the first or second colored film at greater intensity.

23. The method as recited in claim 21, further comprising providing a textured finish to a non-bonding surface of the one or more additional colored films, wherein the textured finish on the non-bonding surfaces of the resin substrate and the one or more additional colored films cooperate to enhance diffusion of light in the laminate resin structure.

24. The method as recited in claim 13, wherein:
one of the resin substrate or the colored film comprises a greater surface roughness on its bonding surface; and
the other of the resin substrate of the colored film comprises a lesser surface roughness.

25. The method as recited in claim 24, wherein:
the greater surface roughness is greater than 20µ inches; and
the lesser surface roughness is less than 20µ inches.

26. The method as recited in claim 25, wherein the greater surface roughness is greater than 50µ inches.

27. The method as recited in claim 25, wherein the greater surface roughness is greater than 60µ inches.

28. The method as recited in claim 25, wherein the greater surface roughness is greater than 250µ inches.

29. A method of preparing a laminate resin structure having a custom color created from a plurality of colored films, comprising:
providing a translucent resin substrate having opposing first and second bonding surfaces that correspond with opposing first and second viewable surfaces, and a glass transition temperature;
aligning a bonding surface of a first colored film directly against a bonding surface of the resin substrate, wherein the first colored film is miscible with the bonding surface of the resin substrate, and comprises a glass transition temperature;
aligning a second colored film about an outside surface of the first colored film, wherein the second colored film is miscible with at least the first colored film, and comprises a glass transition temperature; and
applying heat and pressure to meet or exceed the highest glass transition temperature of the resin substrate, the first colored film, and the second colored film;
wherein:
the resin substrate intermixes with one or both of the first and second colored films to display a third color substantially throughout the resin substrate, regardless of ordering of the first and second colored films on the translucent resin substrate; and
the third color is a composite of the colors of the first and second colored films; and
applying a texture to an outside, non-bonding surface of the resin substrate and colored film combination, wherein a plurality of surfaces in the laminate resin structure comprise a textured finish.

30. The method as recited in claim 29, wherein the resin substrate comprises a thickness that is approximately 6 times the thickness of the first or second colored film.

31. The method as recited in claim 29, wherein the resin substrates comprises material selected from the group consisting of polycarbonate, polyester, PVC, acrylic, and combinations and polymer alloys thereof.

32. The method as recited in claim 29, wherein the first and second colored films comprise the same color, such that fusing the resin substrate and colored films results in the finished resin structure displaying the color at a higher intensity than when created with only one of the first or second colored films.

33. The method as recited in claim 29, further comprising:
positioning a white film layer about the second colored film;
wherein, when fused to the second colored film, the white film layer cooperates with one or more textured surfaces in the laminate resin structure to diffuse light.

34. The method as recited in claim 29, wherein at least the first colored film comprises a texture on the bonding surface that is different from a texture of the bonding surface of the resin substrate.

35. The method as recited in claim 34, wherein the texture of the second colored film comprises a uniform surface roughness that is different from a surface roughness of the first colored film at a bonding interface.

36. A method of preparing a laminate resin structure having a custom color created from a plurality of colored films, wherein the custom color of the plurality of films is diffused substantially throughout the laminate resin structure, regardless of viewing direction, comprising:
providing a translucent resin substrate having opposing first and second bonding surfaces that correspond with opposing first and second viewable surfaces, and a glass transition temperature;
aligning a bonding surface of a first colored film about a bonding surface of the resin substrate, wherein the first colored film comprises opposing bonding surfaces, a uniform texture on at least one of the bonding surfaces of the first colored film, and a glass transition temperature;
aligning a bonding surface of a second colored film about a bonding surface of the first colored film, wherein the second colored film is miscible at least with the first colored film, and comprises opposing bonding surfaces, a uniform texture on at least one of the bonding surfaces of the second colored film, and a glass transition temperature;
applying heat and pressure to meet or exceed the highest glass transition temperature of at least the first colored film and the second colored film; and
applying a textured finish to the aligned resin substrate and colored film combination, wherein a plurality of outside surfaces in the laminate resin structure comprise a textured finish;
wherein the first and second colored films intermix to create a substantially uniform third color that, in cooperation with each texture of the non-bonding and bonding surfaces, is diffused substantially throughout the resulting laminate resin structure regardless of viewing direction.

37. The method as recited in claim 36, wherein the textured finish on the plurality of outside surfaces of the laminate resin structure comprises a uniform distribution of texture granules.

38. The method as recited in claim 36, wherein the texture of the second colored film is different from a texture of the first colored film at a bonding interface between the first and second colored films.

39. The method as recited in claim 36, wherein a texture of the first colored film is different from a texture of the translucent resin substrate at a bonding interface between the first colored film and the translucent resin substrate.

40. The method as recited in claim 36, wherein the translucent resin substrate comprises a material selected from the group consisting of polycarbonate, polyester, PVC, acrylic, and combinations and polymer alloys thereof.

41. The method as recited in claim 40, wherein the translucent resin substrate is miscible with at least the first colored film.

42. The method as recited in claim 36, further comprising providing a lamination enhancer layer between the resin substrate and the first colored film.

43. The method as recited in claim 42, wherein the translucent resin substrate and at least the first colored film comprise heterogeneous materials.

44. The method as recited in claim 43, wherein:
the translucent resin substrate comprises one of PETG, a copolyester, polycarbonate, or acrylic; and
the first and second colored films are co-miscible with each other, but are heterogeneous with the translucent resin substrate.

45. A method of preparing a laminate resin structure having a custom color created from a plurality of colored films, wherein the custom color of the plurality of films is diffused substantially throughout the laminate resin structure, regardless of viewing direction, comprising:
providing a translucent resin substrate having a glass transition temperature;
providing a first colored film having a glass transition temperature about the translucent resin substrate;
providing one or more additional colored films about the first colored film, each of the one or more additional colored films comprising a glass transition temperature, wherein each of the one or more additional colored films is miscible with an adjacent colored film, or the first colored film;
wherein each interface between the resin substrate and first colored film, and between the first colored film and a next one of the one or more additional colored films, in succession, comprises opposing bonding surfaces having a texture of uniform surface roughness on each opposed bonding surface;
wherein the texture of the bonding surface of the resin substrate is different in surface roughness from that of the texture of the bonding surface of the first colored film;
applying heat and pressure to meet or exceed the highest glass transition temperature of each of the first colored film and one or more additional colored films, such that each of the first colored film and one or more additional colored films intermix to create a uniform new color; and
applying a textured finish to one or more outer surfaces of the resin substrate and colored film combination, wherein the textured finish of the one or more outer surfaces and one or more bonding surfaces cooperate to diffuse the uniform new color in the finished panel, such that the uniform new color is displayed substantially the same throughout the finished panel regardless of viewing direction or ordering of films.

46. The method as recited in claim 45, wherein the translucent resin substrate is miscible with at least the first colored film.

47. The method as recited in claim 46, wherein:
the translucent resin substrate comprises a uniform surface roughness on its bonding surface opposed to a bonding surface of the first colored film; and
the opposed bonding surface of the first colored film comprises a uniform surface roughness that is different from the surface roughness of the surface roughness of the resin substrate.

48. The method as recited in claim 46, wherein the surface roughness of the translucent resin substrate or of the first colored film is less than 20µ inches, while the other opposed surface roughness is greater than 20µ inches.

49. The method as recited in claim 45, further comprising providing a lamination enhancer layer between the resin substrate and the first colored film.

50. The method as recited in claim 49, wherein the translucent resin substrate and at least the first colored film comprise heterogeneous materials.

51. The method as recited in claim 45, wherein the translucent resin substrate comprises a material selected from the group consisting of polycarbonate, polyester, PVC, acrylic, and combinations and polymer alloys thereof.

52. The method as recited in claim 45, wherein applying heat and pressure further comprises:
meeting or exceeding the highest glass transition temperature of the translucent resin substrate;
wherein the translucent resin substrate intermixes at least with the first colored film.

53. The method as recited in claim 45, wherein a plurality of outside surfaces of the finished panel comprises a textured finish having a uniform distribution of texture granules.

54. The method as recited in claim 45, further comprising:
positioning one or more white film layers in or about the resin substrate and colored film combination;
wherein the one or more white film layers enhance diffusion of light in the finished panel.

* * * * *